June 28, 1955
R. E. CONKLIN ET AL
2,711,574
METHOD AND APPARATUS FOR THE MANUFACTURE
OF ZIPPER SLIDE AND TAB ASSEMBLIES
Filed Jan. 29, 1951
5 Sheets-Sheet 1
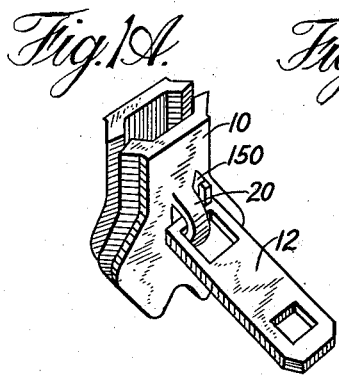
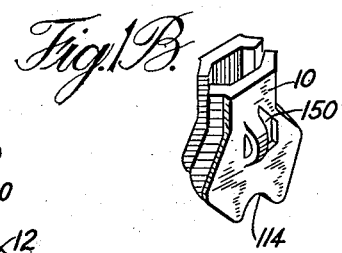
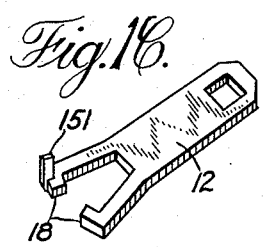
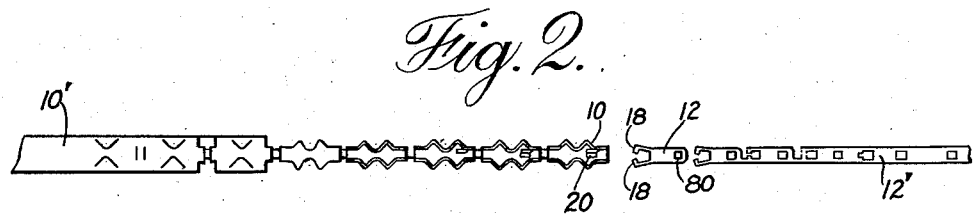
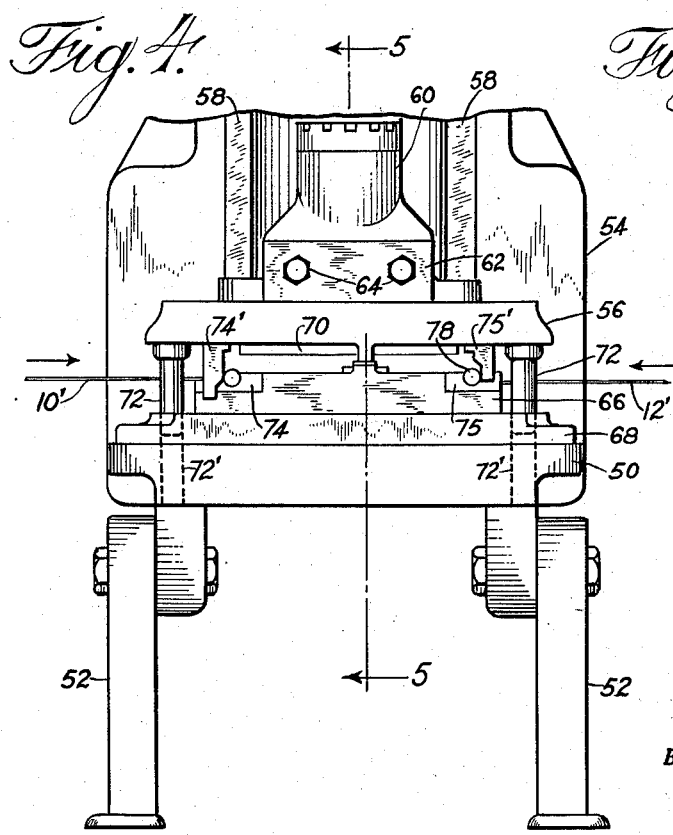
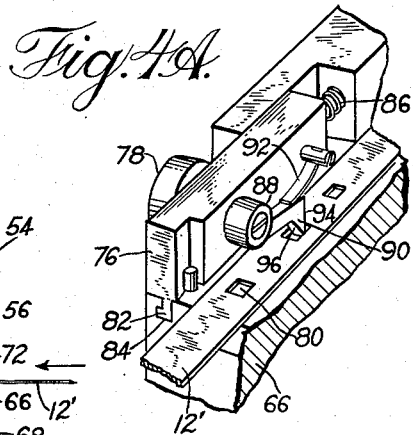
INVENTOR.
Robert Conklin
Jack Seidler
BY Daniel Rubino
ATTORNEYS

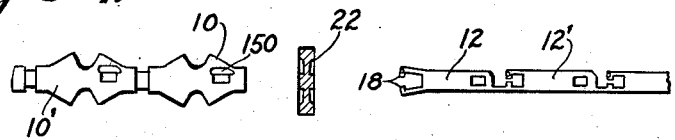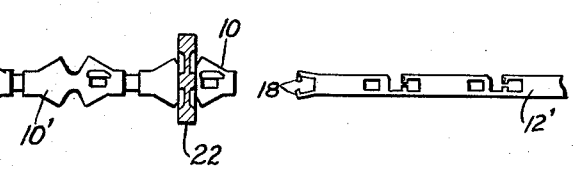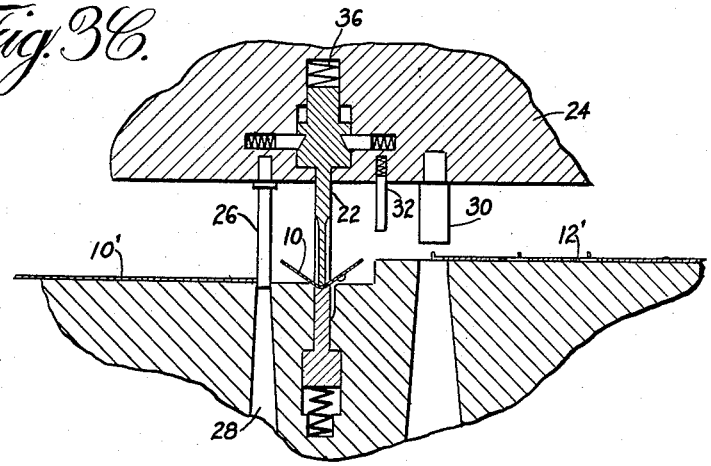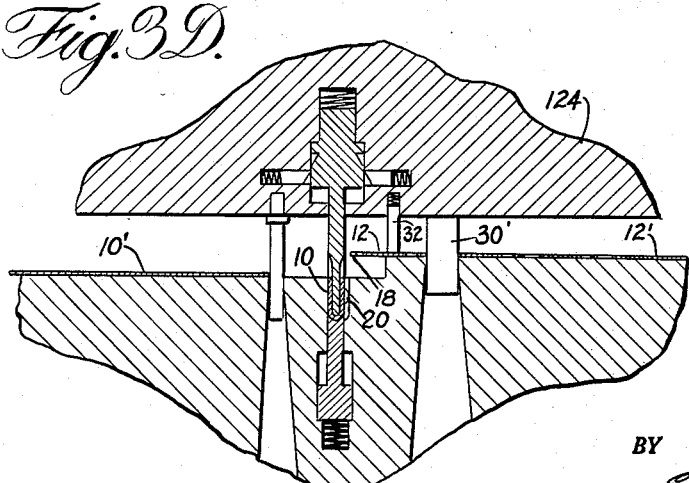

June 28, 1955 R. E. CONKLIN ET AL 2,711,574
METHOD AND APPARATUS FOR THE MANUFACTURE
OF ZIPPER SLIDE AND TAB ASSEMBLIES
Filed Jan. 29, 1951 5 Sheets-Sheet 3
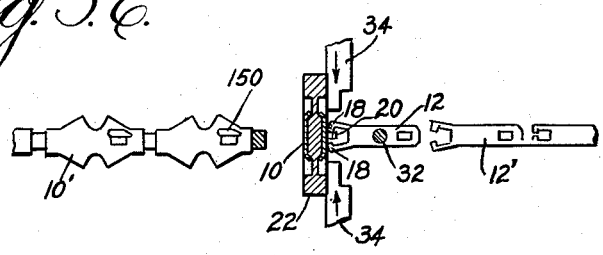
Fig. 3.E.
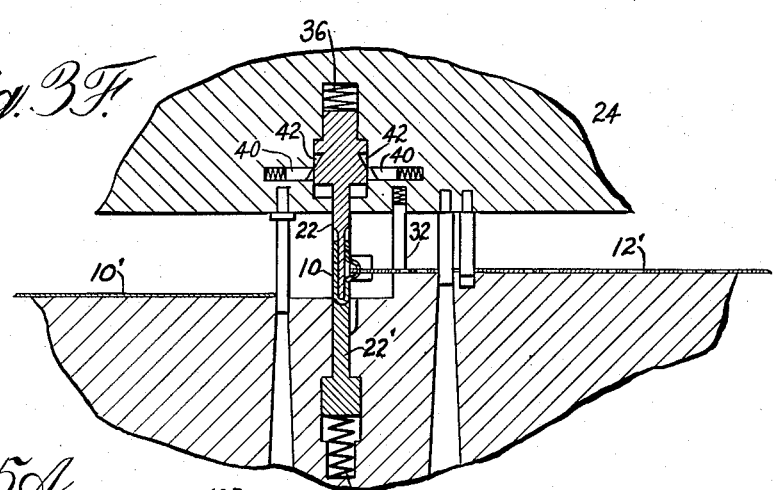
Fig. 3F.
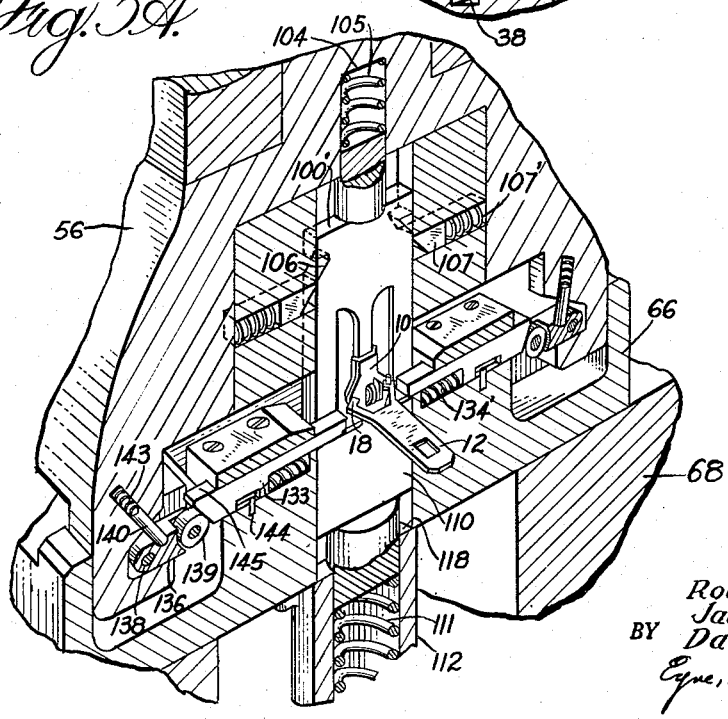
Fig. 5A.
INVENTOR.
Robert Conklin
Jack Seidler
BY Daniel Rubino
Eyre, Mann & Burrows
ATTORNEYS

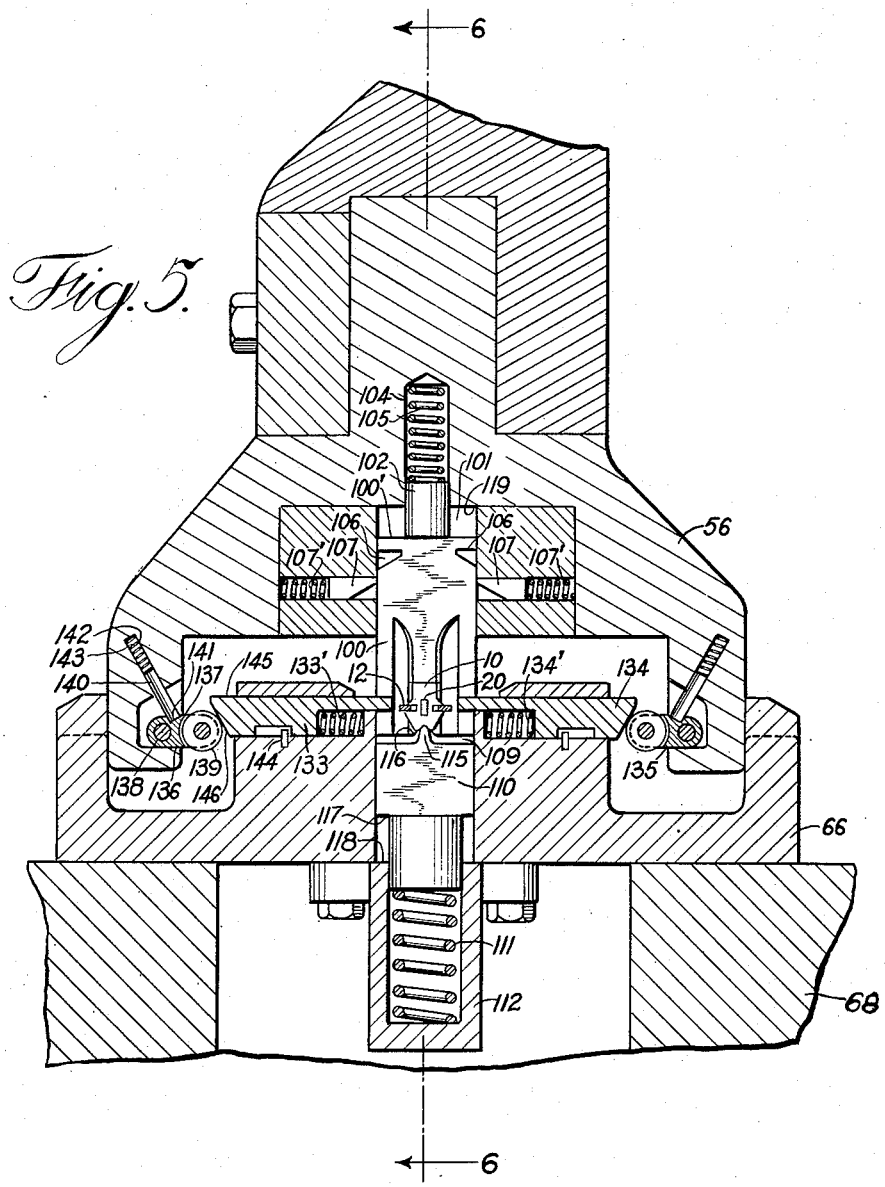

June 28, 1955  R. E. CONKLIN ET AL  2,711,574
METHOD AND APPARATUS FOR THE MANUFACTURE
OF ZIPPER SLIDE AND TAB ASSEMBLIES
Filed Jan. 29, 1951  5 Sheets-Sheet 5

INVENTOR.
Robert Conklin
Jack Seidler
BY Daniel Rubino
Eyre, Mann & Burrows
ATTORNEYS

United States Patent Office 2,711,574
Patented June 28, 1955

2,711,574

METHOD AND APPARATUS FOR THE MANUFACTURE OF ZIPPER SLIDE AND TAB ASSEMBLIES

Robert E. Conklin and Daniel Rubino, Brooklyn, and Jack Seidler, Beachhurst, N. Y.

Application January 29, 1951, Serial No. 208,355

8 Claims. (Cl. 29—34)

This invention relates to the manufacture of slide fasteners and more particularly to the slide and tab elements for opening and closing the fastening elements.

The slide and tab elements, according to present practices, are fabricated separately by conventional metal punching processes, plated and may then be hopper-fed to an assembly machine for connecting a tab to each of the slides, or the tabs and slides may be manually assembled. This procedure does not only require three individual machines and the added man hours for the operation thereof and the individual handling of the separate elements, but the assembly machine provides a constant source of difficulty. The hoppers have been found to clog frequently for one reason or another, such as the presence of slight burrs on the parts, minor deformities, etc., and considerable time and cost are consumed in clearing the hoppers and reinitiating the assembly process. Moreover, as some zipper slides are provided with locks while others are not, separate assembly machines must be provided for each type as they are not readily modified for use with one type or another.

This invention, which uses a single machine to accomplish all three operations for both the plain and lock type zipper slides, not only eliminates the difficulties encountered with the present process outlined above, but also increases production and decreases the unit cost of the assembled tab and slide. Briefly, the slide and tab elements are simultaneouslly punched by a single press and before ejection of the completed parts each tab is connected with a slide. As will be shown, positive alinement of the parts for the connecting step is assured so that it is virtually impossible for the machine to be jammed by slight burrs or other irregularities of the parts.

Other objects of the invention will become more apparent in the following description and drawings forming part of this application.

In the drawings—

Fig. 1A is a perspective view of an assembled slide fastener fabricated in accordance with the invention;

Figs. 1B and 1C are perspective views of the slide and tab elements of Fig. 1A before assembly;

Fig. 2 is a plan view of the partially punched and formed metal strips of which the slides and tabs are fabricated and illustrates the relationship of the strips in the illustrated embodiment of the invention;

Figure 6:
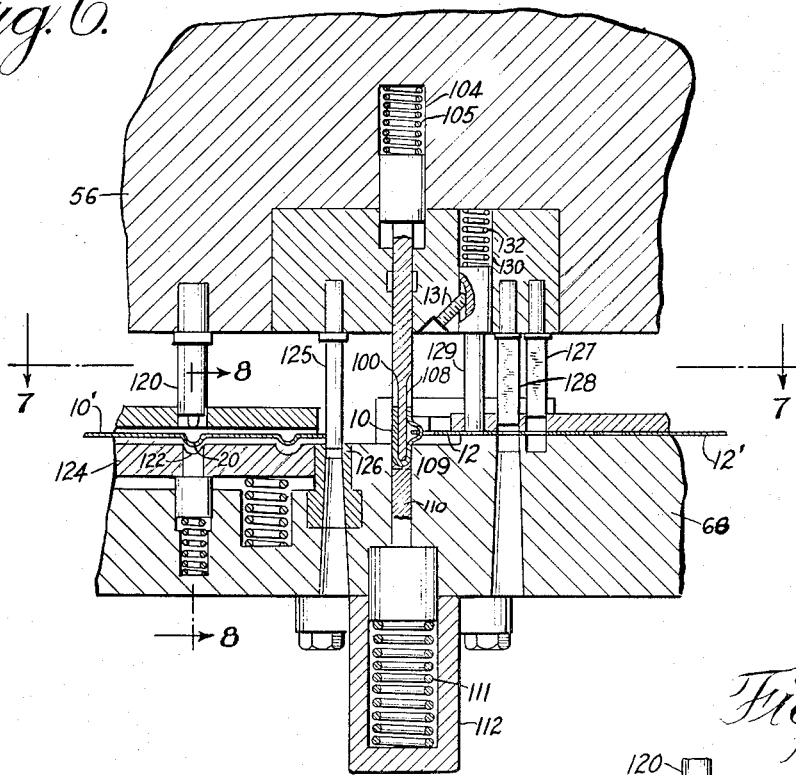
Figure 7:
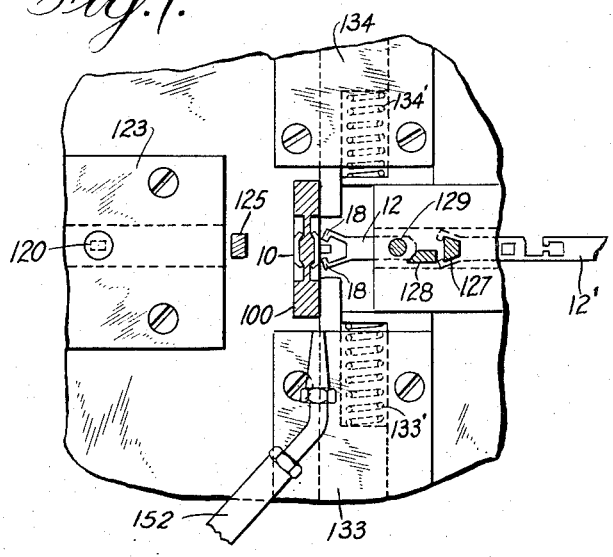

Figs. 3A to 3F inclusive illustrate diagrammatically the steps in the process of fabricating and assembling the slide and tab elements in accordance with the invention;

Fig. 4 is a front elevation of a machine in accordance with the invention;

Fig. 4A is a fragmentary section of Fig. 4 to show one form of strip feeding means;

Fig. 5 is a cross-sectional view taken along the line 5—5 of Fig. 4;

Fig. 5A is a perspective view of the cross-sectional view shown in Fig. 5;

Fig. 6 is a cross-sectional part of Fig. 5 taken along the line 6—6 thereof;

Fig. 7 is a partial section taken along the line 7—7 of Fig. 6; and

Figure 8:
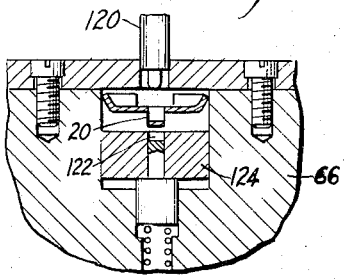

Fig. 8 is a sectional view taken along the line 8—8 of Fig. 6.

The invention concerns a method and means for the fabrication of a slide and tab assembly for zipper fasteners of the type shown in Fig. 1A wherein the slide is denoted by the numeral 10 while the tab is denoted by the numeral 12. The individual elements before assembly are shown in Figs. 1B and 1C respectively.

Conventional practices to our knowledge consist in the fabrication and plating of the slide and tab elements individually and then assembly either by manual means or assembly machines. Manual means are obviously slow and laborious while assembly machines are easily jammed by the presence of burrs, dirt, or irregularities of the parts. This condition is further aggravated by the rough handling of the components during the plating and the assembly machine hopper loading processes which materially damages many of the items. Moreover, with conventional processes separate machines are used for punching the tab and slide elements and as separate assembly machines are used the complete manufacturing process would require at least three machines which, coupled with the necessary personnel for handling and transporting the elements from the punching machine to the assembly machines, add considerably to their cost.

This invention contemplates the fabrication and assembly of the elements in a single machine so that a completely assembled unit such as that shown in Fig. 1A is produced and ready for plating. With this system a single machine replaces three individual machines with the result that a considerable portion of the labor entailed in operation and loading of three separate machines is eliminated. Moreover, as the parts are fastened together in the machine in which they are formed positive alinement is insured and completely overcomes inherent difficulties in the assembly process.

In Fig. 2 we have illustrated two metal strips 10' and 12', the former being that strip of which the slide part 10 is fabricated and the strip 12' being the strip of which the tab 12 is fabricated. These strips 10' and 12' are illustrated in the manner in which they would be processed by the apparatus in accordance with the illustrated embodiment of the invention. The strips are fed lengthwise into opposite sides of the machine and in alinement one with the other. The parts are fabricated in steps in accordance with conventional punching processes as the strips feed toward the center of the machine. As will be explained, the innermost slide element 10 upon being severed from the strip 10' during the manufacturing process according to this invention is bent to form the finished slide 10. During the slide bending step a tab 12 is severed from its strip after having been first fed to bring the open jaws 18 into engagement with the bail 20 of the bent slide 10. When the jaws 18 are in alinement with the bail 20, means in the machine automatically closes these jaws to firmly engage them with the recesses in the bail 20. During the actual operation wherein the tab 12 is fastened to the bail 20, the slide bending means is halted momentarily and provides accurate and precise alinement of the bail and jaws for assembly. After the clamping operation is completed a tab holding means is released and the slide bending means continues through the remainder of its operating cycle to strip the finished tab 10 from the bending apparatus and permit it to be discharged from the machine under the action of compressed air or other suitable ejecting means.

Figs. 3A to 3C inclusive show a series of steps in the fabrication and assembly of the slide 10 and the tab 12.

In Fig. 3A the bending die of the apparatus in accordance with the invention is diagrammatically illustrated at 22. This die is generally located about the center of the machine and the strips 10' and 12' are fed in from opposite sides of this bending die and are formed in a series of distinct steps as they approach it. This figure shows the position of the strips 10' and 12' immediately upon ejection of a finished tab and slide from the apparatus. The leading slide 10 still connected with the strip 10' is ready for the bending operation while the leading tab 12 still connected with its strip 12' is ready for the fastening or assembling operation.

In Fig. 3B the strip 10' has been moved to bring the center portion of the leading slide 10 directly beneath the bending die 22. No movement, however, has been imparted to the tab strip 12'. As the head 24 of the press used to fabricate the slide and tab parts according to this invention continues to move downwardly after the strip 10' has been moved to feed a slide part beneath the bending die 22, the leading slide 10 is first severed by a cutting means 26 that is somewhat longer than the bending die 22 and of course cooperates with a suitable recess 28 into which it may move after completing the severance of the slide 10. During this movement, the tab strip 12' has started to move to the left and it will be seen that the innermost end of this strip is partially beneath a tab severing die 30. As the head 24 continues to move downwardly (Fig. 3D) the slide 10 is completely bent and the leading tab 12 is fed inwardly to a point where the jaws 18 are in a position to engage the bail 20 on the slide. At this point a spring loaded clamping means 32 holds the tab 12 about to be severed firmly against the base of a machine while the cutting die 30 completes the severing operation. It is to be understood, of course, that as the head 24 of the machine proceeded downwardly to accomplish the foregoing operations other portions of the strips 10' and 12' were preformed by suitable dies also carried by the head of the machine, so that the slide and tab parts are fabricated simultaneously with the assembly operation.

Fig. 3E is a plan view of the strip 10' and 12' to show the relationship between the jaws 18 of the leading and severed tab 12 and the bail 20 of the formed slide 10. In this figure the slide 10 is still carried by the bending die 22. A pair of cams 34 are shown beginning to travel inwardly to clamp the jaws 18 in the bail 20 and during this period the clamping means 32 holds the tab firmly in position and the movement of the bending die 22 upwardly is momentarily halted. The diagrammatic front elevation of the disposition of the various elements of the machine at this precise stage of the operation is shown in Fig. 3F. Briefly, it may be mentioned that the period of dwell of the bending die 22 is accomplished by the action of the spring 36 operating to move the bending die 22 relative to the head 24, the lower spring 38 cooperating with the die part 22' which operates in conjunction with the bending die part 22 to form the slide 10 and the spring loaded cams 40 and cooperating recesses 42 in the upper die part 22. The action of these elements will be explained in connection with the detailed description of the machine.

Referring to Fig. 4, a front elevational view of the apparatus in accordance with the invention, the basic apparatus is a conventional punch press having a bed 50 supported by the legs 52. The upper frame 54 is arranged to carry a reciprocating head 56 guided throughout its vertical movement by a pair of rods 58. Mechanical reciprocating motion is transmitted to the head 56 by means of the member 60, that may be driven in any suitable manner as by an electric motor and reciprocating mechanism. The member 60 is fastened to the head 56 by means of a flange 62 that may be formed as part of the head 56, by the bolts 64 passing through the flange and the reciprocating member 60.

The lower or female portion of the die for fabricating the slide and tab parts is denoted by the numeral 66. This die is fastened to a base plate 68 which in turn is securely bolted to the bed 50 of the press. The upper die portion 70 is carried by the reciprocating head 56. Since the construction and operation of dies and presses of this character is well known in the art, the die parts 66 and 70 have been illustrated diagrammatically.

To insure accurate alinement of the die parts 66 and 70 in the operation of the equipment, two or more guiding members 72 are provided and are preferably fastened and carried by the head 56. They cooperate with recesses 72' in the base plate 68 and bed 50 to attain the desired alinement.

In the operation of the press the strips of metal 10' and 12' are preferably fed into opposite sides of the machine and at substantially the same level. As these strips are fed into the machine the parts are fabricated in successive steps as shown in Fig. 2. Conventional practice provides for the fabrication of the slide part by one machine and the tab part by another machine, whereas the apparatus shown in Fig. 4 simultaneously forms both the tab and the slide, though the formation or fabrication is carried out in a conventional manner.

As pointed out in the discussion of Figs. 3A to 3F, the feeding means for strips 10' and 12' must be adjusted so that the strip 10' is first fed inwardly during the downward movement of the head 56 and at a predetermined time later the strip 12' is moved inwardly of the machine. This is accomplished by means of the slidable feeding blocks 74 and 75 and their cooperating cams 74' and 75'. As the head is moved downwardly the cam 74' contacts the roller 76 on the block 74 to move it to the right. A short time later in the downward movement of the head 56 the cam 75' contacts the roller 78 on the slidable block 75 to move it to the left. As these blocks are moved inwardly of the machine they carry the strips 10' and 12' with them.

In Fig. 4A we have illustrated one method for accomplishment of this end and as both the slidable blocks on feeding means 74 and 75 are identical, only the feeding means 75 has been illustrated. In this adaptation the feeding means 76 is positioned at a point after the first punching operation for the formation of the tabs 12. This punching operation forms the opening 80 in the strip which ultimately forms the rectangular opening on the end of the finished tab. The block 76 is slidably carried by the die member 66 by means of a cooperating L-shaped flange 82 and recess 84 and is retained in an outward position by a coil spring 86. The roller 78 carried by the slidable block 76 is rotatably mounted on the end of a shaft 88 passing through the blocks 76 and carrying on its inner end a latch or key 90. This catch is held in a downward position by a flat spring 92 carried on one end by the block 76, the other end bearing downwardly on the key 90. This key 90 has a flat forward portion 94 and a tapered rear surface 96. As the cam 75' is moved downwardly by the head 56 it contacts the roller 78 and forces the block 76 inwardly toward the center of the machine and compresses the spring 86. Since the forward edge 94 of the key 90 is essentially in a vertical plane it engages the forward edge of the opening 80 in the strip 12' and carries the strip forwardly a distance fixed by the structure of the cam 75'. When the machine moves upwardly the cam 75' is removed from engagement with the roller 78 and the spring 86 moves the block 76 away from the center of the machine. Since the back side 96 of the key is sloped it does not carry the strip 12' with it but slides out of engagement with the strip and moves backwardly far enough to engage the next opening 80. The spring 92 of course insures engagement of the key with the openings 80 so that the strip may be moved forwardly by the key but spring 92 permits the key to move out of engagement with the openings 80 when the block 76 is moved backwardly.

The assembly of the tab and slide parts is carried out at a point centrally of the die parts 66 and 70 as shown in Fig. 4. The details of the apparatus for accomplishing this end are shown in Figs. 5, 5A and 6 through 8.

With reference to these figures, the reciprocating head 56 of the machine carries a bending die 100 slidably retained within a suitable opening 101 in the head. Extending from the upper portion of the slidable bending die 100 is a cylindrical member 102 that slidably engages a corresponding recess 104 in which is disposed a compression spring 105 tending to urge the die part 100 downwardly. Fig. 5 shows the member 100 in its dwelling or tab engaging position, while Figs. 5A and 6 illustrate it in the position in which the tab 12 is secured to the bail 20 of the slide 10.

The bending die 100 is provided in this embodiment with a pair of opposing recesses 106 that cooperate with keys or cams 107, slidably mounted blocks 108 forming opposing walls of the opening 101 and movable with the head 56. The cams 107 are forced inwardly toward the member 100 by springs 108 and cooperate with the recesses 106 in the bending member to effect the desired movement of that member. For instance, these cams provide for the dwell period in the upward movement of the slide 10 during its bending operation to permit the attachment of the tab 12.

As is evident in Fig. 6, the bending die is formed as indicated at 108 with a grooved lower section about which the slide 10 is formed during the bending operation. The bending of the slide 10 occurs as it is forced into an opening or recess 109 in the lower die part 66. Within this recess is a lower cooperating bending die part 110 slidably retained within the recess 109 and forced upwardly by a spring 111 contained within a housing 112 depending from the die part 66, the die 110 being formed with a depending part 113 slidably engaging the opening in the housing 112 and bearing against the spring 111.

Fig. 1B illustrates the slide part 10 upon completion of the bending operation. This slide is formed with a curved recess 114 in its bent edge that is effected by means of a rounded projection 115 extending upwardly from the lower die part 110 and preferably formed integrally therewith. This projection cooperates with a corresponding recess 116 in the upper bending die part 100 to indent the slide as it is bent.

The upper and lower bending die parts 100 and 110 were described as being urged inwardly toward each other by their respective cooperating springs 105 and 111. The action of the springs together with the operation of the keys or cams 107 cooperating with the recesses 106 in the upper die part 100 function to control the movement of the upper die part 100. In this way after the slide 10 is bent by forcing it into the recess 109, the upper bending die 100, together with the slide 10, is retracted to a point where the bail 20 of the slide is in a position to receive and be fastened to the tab 12. By reason of the action of the springs and the cams the upper die 100 dwells momentarily at this point to permit attachment of the tab 12, whereupon it then proceeds upwardly. This action is obtained in the following manner.

When the head 56 of the machine is in the raised position the cams or keys 107 are engaged in the recesses 106 of the upper die part 100. As the head proceeds to move downwardly the keys carry the bending die 100 downwardly with it. The springs 107' are strong enough to effect the bending operation of the slide 10 and in addition move the lower bending die part 110 downwardly to compress the spring 111. The downward movement of the die part 110 is limited by the shoulder 117 on the die part 110 and the cooperating shoulder 118 on the upper edge of the depending housing 112. At this point the bending of the slide 10 is completed but the head 56 of the press must proceed a further distance downward to complete other punching operations. With this further downward movement the keys 107 are forced out of the recesses 106 in the upper die part 100 and they move downwardly relative to the die part 100. As soon as the keys are released, the spring 111 tends to move both bending die parts upwardly but since the head 56 is in the lowermost position with the upper shoulder 100' of the upper die 100 in close proximity to the cooperating shoulder of the head 56, little or no movement is experienced at this point.

Upon movement of the head upwardly, the spring 111 forces both die parts, including the slide 10, upwardly and against the action of the spring 105 until the bail 20 of the slide 10 reaches the position for engagement with the tab. At this point the independent movement of the two die parts stops, while the head 56 continues in the upward direction. Since the keys 107 are still displaced from the recesses 106 in the upper die part 100, the die parts will remain stationary for that interval of time required for the head 56 to move upwardly far enough to cause the keys 107 to reengage the recesses 106. During this interval of time the jaws 18 of the tab 12 are clamped in engagement with the bail 20. When the head 56 moves to a point where the keys 107 engage the recesses 106, the upper bending die 100 is moved upwardly to permit removal of the assembled slide fastener from the upper die part 100 and discharge from the apparatus.

In Fig. 6 we have illustrated the final steps of forming and severing the slides 10 and tabs 12 from their respective strips 10' and 12' to show the coordination of the forming steps with the assembly step. In the fabrication of the slide part, the formation of the bail 20 is the last operation that is performed prior to its actual severance from the strip and bending to form the completed slide. The bail 20 is formed by the forming die 120 carried by the head 56. This die has a small rounded projection 121 that presses the metal forming the slide 10 into a rounded recess 122 in the lower die part 66. Upon formation of the bail 20, added clearance is of course required between the upper and lower guide plates 123 and 124 to accommodate this deformation of the strip 10'. The severing operation is carried out by the punch 125 cooperating with the corresponding die part 126. As previously pointed out, the severance is accomplished while the bending die 100 is in contact with the slide 10 to be bent, so that the slide can not possibly slip from its position after its final severance by the punch 125.

The final step in the formation of the tab 12 comprises the spreading of the tab jaws 18. This is accomplished by a spreading die 127 after the preceding tab has been severed by the punch 128. When the strip 12' is fed into the machine to bring the leading tab 12 with its jaws 18 into engagement with the bail 20, a spring-loaded holding means 129 is brought firmly against the tab 12 to hold it against the lower die part 66. This holding means is slidably retained within a cylindrical recess 130 in the upper die part 70 and retained therein by suitable means such as the screw 131. The spring 132 continually urges the holding die 129 into the downward position. After the tab 12 is firmly held in position the severing means 128 severs the leading tab from the strip and the spreading die 127 spreads the jaws 18 of the next succeeding tab 12.

The tab 12 is attached to the slide 10 by means of a pair of transversely operated cams 133 and 134 that are moved inwardly against the action of the springs 133' and 134'. The transverse movement of these cams is controlled by a pair of hinged rollers 135 and 136. As these roller assemblies are identical, only that indicated at 135 will be described. It comprises a link 137 rotatably mounted on a shaft 138 carried by the head 56. The upper end of the link 137 carries a roller 139. The pivoted link 137 and the roller 139 are held in the downward position as illustrated in Fig. 5, by means of a short rod or pin 140 pivotally connected to the link 137 at 141 and extending into an angularly disposed recess 142 in the head 56. A spring 143 within this recess urges the pin 140 in a downward direction to hold the link 137 in the illustrated position in the absence of any external force.

When the head 56 of the apparatus is in the extreme upper position the roller 139 and link 137 are in the position as illustrated and the cam 133 moves to an outward position determined by the stop 144. As the head 56 proceeds downwardly, the roller 139 will contact the upper edge 145 of the cam 133. At this point the spring 143 will be compressed so that the roller 139 may move upwardly and pass by the cam 133 without moving it in an inward direction. After the head 56 has completed its downward travel and proceeds to move upwardly, the roller is in the downward position as shown in Fig. 5. As the upward movement continues, the roller will contact the sloping surface 146 of the cam 133. As the link 137 can not move below a horizontal position continued upward movement of the head will cause the roller to force the cam 133 inwardly. This inward movement forces the jaws 18 into engagement with the bail 20. Continued upward movement of the head 56 disengages the roller 139 with the cam 133 and permits it to snap outwardly to the position shown in Fig. 5. The inward motion of the cams 133 and 134 is coordinated with and occurs during the dwell position previously described in connection with the operation of the bending dies 100 and 110.

After, in one cycle of operation of the device as described, one slide and tab assembly has been completed the assembly is immediately removed or ejected from the die by any appropriate means known to those skilled in the art, so as to make room for the next assembly to take place in the next following cycle of operation. One of such means is removal by gravity which is possible though not overly practical in those cases where the power press is sufficiently inclinable. In other cases the completed assembly may be conveniently ejected or removed by means of an air blast through a properly located nozzle as shown in Fig. 7, the air blast being controlled or released in a well known manner through a valve operated from one of the moving parts of the press which take part in each cycle of operation at a predetermined instant thereof.

With this invention it will be noted that the slide 10 is not removed from the bending die 100 until after the connection of the tab 12 to the bail 20. Furthermore, tab 12 to be attached to a slide is not severed from its strip until after the jaws are fed into the engaging position by displacement of the strip inwardly, at which point the tab to be severed is first clamped in position and then severed. In this way positive and accurate alinement of the tab with the slide is insured and there is no possibility, assuming proper operation of the preforming dies, of jamming of the apparatus during the assembly process. Thus with a single machine the tab and slide parts may be simultaneously formed with each slide and tab being assembled in position in the machine as they are formed. This apparatus, therefore, not only eliminates the need for separate apparatus for the fabrication of the slide and tab parts, but also eliminates the necessity for a complicated assembly machine that, because of its inherent characteristics, is subject to frequent jamming because of bent slides or tabs or the presence of dirt or burrs.

The invention is useful with the several types of slide and tab assemblies presently employed in connection with zipper fasteners. The particular slide and tab assembly illustrated herein is of the type employing a locking means which comprises an opening 150 in the slide 10 and locking member 151 extending from one of the jaws 18 of the tab 12. The bail 20 of the slide 10 may also be of the open or closed type, that is, the bail 20 may be provided with a central partition so that there is no possibility of the tab 12 being displaced from its position as generally shown in Fig. 1A. The open bail would permit sidewise rotation of the tab 12, and although it is generally not used today it can be fabricated with the apparatus in accordance with the invention.

We claim:

1. Apparatus for fabricating zipper slide and tab assemblies comprising means for forming in each operational cycle simultaneously the slide and tab parts, means for feeding in the same cycle one just a finished tab into an engaging position with one just completed slide, means for permanently connecting in the same cycle the said tab and slide while in the engaging position, and means for releasing at the end of each cycle one assembled slide and tab for ejection from the machine.

2. Apparatus for manufacturing zipper slide and tab assemblies comprising both means for simultaneously forming the tab and slide parts from continuous strips of metal, and means for severing and bending the leading slide part to final form, means for feeding the leading tab part into position ready for engagement with the slide when bending of the latter to final form is completed, means for severing and holding the tab in the position ready for engagement, means for permanently connecting the tab and slide, and means for controlling the relative timing of the several forming, bending, severing, holding and connecting operations.

3. Apparatus for manufacturing zipper slide and tab assemblies comprising a reciprocating head controlling means for forming the slide and tab parts successively from continuous strips, means for severing the leading slide and bending it to form the completed part, means for feeding the leading tab into a slide engaging position and severing and holding the tab in that position, means for momentarily interrupting the motion of the slide bending means upon completion of the bending and with the slide in the engaging position, means for fastening the tab to the slide while the movement of the latter is momentarily interrupted, means for releasing the tab and slide and ejecting the assembly from the apparatus, and means for controlling the relative timing of the several forming, bending, severing, holding and fastening operations.

4. Apparatus for manufacturing slide and tab assemblies according to claim 3 wherein said motion interrupting means comprises engageable cooperating means, one of said cooperating means being lodged in the reciprocating head of the apparatus, the other being provided on said bending means, said cooperating means being adapted to cause first the bending operation to be completed while the said cooperating means are engaged, and thereupon to move one of said cooperating means consisting of a disengageable key out of engagement during continued foreward movement of said head relative to said bending means, said bending means thereby remaining stationary during the disengaging movement of said cooperating means and during the rest of the forward movement of said head relative to said bending means and through part of the following reverse movement of said reciprocating head equivalent to said relative forward movement thereof after which said cooperating means re-engage each other to return said bending means to its starting position during the remainder of the reverse movement of said head.

5. Apparatus for manufacturing zipper slide and tab assemblies comprising upper and lower die parts movable relative one to the other to simultaneously form the slide and tab parts from continuous strips, and means for attaching each tab and slide comprising upper and lower bending dies for bending each slide as it is severed from the strip, a key carried by one of the first said die parts and engaging one of the bending die parts for imparting motion thereto to effect the bending operation during movement of the first die part one toward the other, said key being disengaged upon completion of the bending operation and moved relative to its cooperating die part during completion of the slide and tab forming operation of the first die parts, means for moving both bending die parts and said key simultaneously in the reverse direction upon the retraction of the first said die parts, means for interrupting the upward movement of the bending dies with the slide in the tab engaging position while the keys continue to be in retracted position, means for feeding the leading tab into engagement with the slide and severing it from its strip, transversely movable means actuated by retractive motion of the first said die parts to connect the tab and slide during the period that the motion of the bending die is interrupted, and means for retracting said transversely movable means, said key upon further retraction re-engaging the upper bending die part to complete its retraction.

6. Apparatus for manufacturing slide and tab assemblies for zipper slide fasteners comprising a press having a reciprocating head and a fixed bed, a lower forming die stationarily fastened to the bed and an upper cooperating forming die fixed to the head, means for feeding two different metal strips from directions opposite to each other between the forming dies to simultaneously form the slide and tab elements separately but in predetermined relation of timing and location, and means centrally of the forming dies for connecting the slide and tab elements as they are fabricated.

7. Apparatus for manufacturing slide and tab assemblies for zipper slide fasteners comprising a press having a reciprocating head and a fixed bed, a lower forming die fastened to the bed and an upper cooperating forming die fixed to the head, means for feeding metal strips between the forming dies to simultaneously form the slide and tab elements, slide bending means disposed centrally of the forming dies consisting of upper and lower bending dies, said upper die being carried by the head and held in one position therein against the action of a compression spring by at least one disengageable key, a spring-loaded lower bending die in the bed of the press, said upper and lower bending dies cooperating during a part of the downward motion of the head to bend a slide, said head moving the last said dies to their lowermost position against the action of the lower compression spring and effecting disengagement of the key and the upper bending die and relative displacement thereof during the remainder of the downward motion and upon retraction moving upwardly and permitting simultaneous upward movement of the bending dies under the action of the lower compression spring to bring the bent slide into the tab-engaging position, means for actuating the tab feeding means to bring a finished tab with its jaws into the engaging position to coincide in time with the positioning of the bent slide, transversely movable cams alined with the tab jaws in the engaging position, and means on said head for actuating said cams upon upward movement of the head to force them inwardly to close the jaws to engage cooperating means on the slide, said head moving continuously during its upward movement and moving relative to the bending dies for a time determined by degree of displacement of the key and the upper bending die during which time the slide and tab are connected, whereupon continued upward movement brings the key into engagement with the upper bending die member withdrawing it from engagement from the lower die member, and freeing the assembled slide and tab for ejection from the jaws.

8. The method of manufacturing zipper slide and tab assemblies automatically and in consecutive cycles of operation, consisting in each cycle of the following steps: feeding two continuous strips of material in directions converging towards a point of assembly; developing from one of said strips of material progressively the tabs to a condition ready for assembly with a slide except for the foremost tab still being connected by material with the said strip, and simultaneously developing from the other continuous strip of material progressively the slides to a condition ready for assembly with a tab except for the foremost slide still being connected by material with said second strip and for being stretched out in substantially flat position; severing the foremost slide from its strip of material and bending the severed slide to U-shape with its side prepared for receiving a tab facing towards the said foremost tab; feeding the foremost tab into engagement with the completely formed U-shaped slide; severing this tab from its strip while held in engagement with said slide and immediately fastening the said tab to said slide; and ejecting the completed slide and tab assembly.

References Cited in the file of this patent

UNITED STATES PATENTS

| | | |
|---|---|---|
| 2,026,413 | Binns et al. | Dec. 31, 1935 |
| 2,225,739 | Elliot | Dec. 24, 1940 |
| 2,339,410 | Keller | Jan. 18, 1944 |
| 2,354,690 | Lawson | Aug. 1, 1944 |
| 2,384,145 | Voity et al. | Sept. 4, 1945 |